US009759423B2

(12) United States Patent
Lemont et al.

(10) Patent No.: US 9,759,423 B2
(45) Date of Patent: Sep. 12, 2017

(54) METHOD AND DEVICE FOR THERMAL DESTRUCTION OF ORGANIC COMPOUNDS BY AN INDUCTION PLASMA

(75) Inventors: Florent Lemont, Villeneuve les Avignon (FR); Karine Poizot, Pont-Saint-Esprit (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 502 days.

(21) Appl. No.: 13/512,303

(22) PCT Filed: Nov. 25, 2010

(86) PCT No.: PCT/EP2010/068254
§ 371 (c)(1),
(2), (4) Date: Jun. 25, 2012

(87) PCT Pub. No.: WO2011/064314
PCT Pub. Date: Jun. 3, 2011

(65) Prior Publication Data
US 2012/0277515 A1 Nov. 1, 2012

(30) Foreign Application Priority Data
Nov. 27, 2009 (FR) ...................................... 09 58451

(51) Int. Cl.
| F23G 5/14 | (2006.01) |
| F23G 5/08 | (2006.01) |
| F23G 5/02 | (2006.01) |
| F23L 7/00 | (2006.01) |
| H05H 1/30 | (2006.01) |

(52) U.S. Cl.
CPC ............. F23G 5/085 (2013.01); F23G 5/02 (2013.01); F23G 5/14 (2013.01); F23L 7/007 (2013.01); H05H 1/30 (2013.01); F23G 2204/201 (2013.01); F23G 2209/142 (2013.01); F23G 2209/18 (2013.01); Y02E 20/344 (2013.01)

(58) Field of Classification Search
None
See application file for complete search history.

(56) References Cited

U.S. PATENT DOCUMENTS

| 3,231,401 | A | * | 1/1966 | Price et al. .................... 501/105 |
| 4,438,706 | A | | 3/1984 | Boday et al. |
| 4,479,443 | A | | 10/1984 | Faldt et al. |
| 4,644,877 | A | | 2/1987 | Barton et al. |
| 4,886,001 | A | | 12/1989 | Chang et al. |
| 4,918,915 | A | * | 4/1990 | Pfefferle .................... F02C 3/20 60/39.12 |
| 5,263,317 | A | * | 11/1993 | Watanabe et al. .............. 60/275 |
| 5,288,969 | A | | 2/1994 | Wong et al. |
| 5,503,089 | A | * | 4/1996 | Frontini et al. ................ 110/185 |
| 5,505,909 | A | | 4/1996 | Dummersdorf et al. |
| 5,723,838 | A | * | 3/1998 | Shin et al. .................... 204/157.3 |
| 7,964,170 | B2 | * | 6/2011 | Singh ............................ 423/224 |
| 8,272,206 | B2 | * | 9/2012 | Lee et al. ....................... 60/275 |
| 2003/0051991 | A1 | * | 3/2003 | Santilli ........................ 204/164 |
| 2005/0044854 | A1 | * | 3/2005 | Cazalens et al. ............... 60/740 |
| 2007/0266633 | A1 | | 11/2007 | Tsangaris et al. |
| 2008/0241004 | A1 | * | 10/2008 | Jayne et al. .................. 422/173 |
| 2008/0277265 | A1 | * | 11/2008 | Tsangaris et al. ....... 204/157.15 |
| 2009/0200180 | A1 | * | 8/2009 | Capote .................. C02F 1/4608 205/744 |
| 2010/0044477 | A1 | * | 2/2010 | Foret ...................... B01J 19/126 241/5 |

FOREIGN PATENT DOCUMENTS

| DE | 100 61 828 A1 | 6/2002 |
| FR | 2 541 428 A1 | 8/1984 |
| FR | 2 764 163 A1 | 12/1998 |
| FR | 2765322 A | 12/1998 |
| FR | 2 866 414 A1 | 8/2005 |
| FR | 2866414 | * 8/2005 |
| JP | H02-131116 A | 5/1990 |
| JP | 04-227407 A | 8/1992 |
| JP | H08-004707 B | 1/1996 |
| JP | 08-150315 A | 6/1996 |
| JP | 08-178248 A | 7/1996 |
| JP | 2004-204094 A | 7/2004 |
| JP | 2007-524800 | 8/2007 |
| JP | 2008-272565 A | 11/2008 |
| WO | WO 2005/080873 | 9/2005 |

OTHER PUBLICATIONS

International Preliminary Report on Patentability issued on Mar. 6, 2012 for International Application No. PCT/EP2010/068254.
International Search Report issued on Apr. 8, 2011 for International Application No. PCT/EP2010/068254.
Japanese Decision of Rejection dated Nov. 24, 2014 for Japanese Application No. 2012-540437 which corresponds in priority to above-identified subject U.S. application.
Japanese Office Action dated Nov. 24, 2014 for Japanese Application No. 2012-540437 which corresponds in priority to above-identified subject U.S. application.

\* cited by examiner

*Primary Examiner* — Melvin C Mayes
*Assistant Examiner* — Sheng H Davis
(74) *Attorney, Agent, or Firm* — Knobbe Martens Olson & Bear LLP

(57) ABSTRACT

A method and device for chemical destruction of at least one feed comprising at least one organic compound are provided. The device comprises at least one inductive plasma torch, means for introducing at least one plasma-forming gas into the torch, optionally when the plasma gas(es) comprise(s) no or little oxygen, means for bringing oxygen gas into the plasma or into the vicinity of the plasma, means for introducing the feed into the torch, a reaction enclosure capable of allowing thermal destruction of the gases flowing from the torch, a device allowing mixing of the gases flowing out of the reaction enclosure to be carried out, means for introducing air and/or oxygen gas into the mixing device, a device allowing recombination by cooling of at least one portion of the gases from the mixing device, the torch, the reaction enclosure, the mixing device and the recombination device being in fluidic communication.

14 Claims, 7 Drawing Sheets

METHOD AND DEVICE FOR THERMAL DESTRUCTION OF ORGANIC COMPOUNDS BY AN INDUCTION PLASMA

RELATED APPLICATIONS

This application is a U.S. National Phase of International Application No. PCT/EP2010/068254, filed Nov. 25, 2010, designating the U.S., and published in French as WO 2011/064314 on Jun. 3, 2011 which claims the benefit of French Patent Application No. 09 58451 filed Nov. 27, 2009.

TECHNICAL FIELD

The present application relates to a method and to a device for thermal destruction of organic compounds by an induction plasma.

More specifically, the invention relates to a method and device for thermal destruction of a feed, charge, load, comprising at least one organic compound, by means of at least one induction plasma formed by at least one plasma gas ionized by an inductor or a inductive turn.

The feed may be composed of wastes and may notably be found in liquid, gas or powdery form, this may in particular be a radioactive feed.

The organic compounds may be harmful, toxic or dangerous compounds such as hydrocarbons or organochlorinated products.

The technical field of the invention may generally be defined as that of the destruction of wastes by a thermal treatment, and more particularly as that of the destruction of wastes by means of an induction plasma.

BACKGROUND

The problem of treating wastes has been crucially posed for about ten years. Indeed, the majority of the wastes were, in the past, simply deposited in dumps, and therefore no real management of these wastes was carried out.

But now, changes in the nature and amount of wastes have led to adopting an industrial approach in order to carry out their treatment.

Numerous technologies are thus applied for treating wastes so that development may continue without being harmful to the environment. These high performance technologies for destroying wastes have in common that they comprise both a method for destroying the wastes, treatments of the fumes produced during this destruction and management of the liquid or solid residues which are possibly obtained.

Generally, thermal methods for destroying wastes are used in order to overcome the problem posed by the stability of many chemical compounds. Thus, installations for destroying dangerous products are traditionally incinerators, in which, for example, liquid products are mixed with solid products in order to be burned.

However by incinerating the wastes, volatile residues are obtained which further need to be removed.

Moreover, these installations require sizeable volumes for allowing complete reactions between the fuel and the comburent, oxidizer and for reducing operational costs.

In order to find a remedy to these drawbacks, many methods for destroying wastes use plasma technologies. Indeed, methods applying a plasma have the advantage of allowing reduction in the size of the required installations since plasma incinerators give the possibility of attaining very high temperatures and of therefore accelerating the chemical reactions for destroying the wastes and for recombining the thereby obtained chemical elements.

In document [1], efforts are made for destroying organic products by means of a blown arc plasma. The gases from the combustion of the wastes are mixed with air, water or oxygen at the outlet of the plasma torch in a segmented tubular stage. This technique allows destruction of gas wastes in an easy way by mixing the wastes with the plasma gas from the arc torch. Nevertheless, the efficiency of the method is reduced because the feeds to be destroyed do not pass into the torch. Destruction of liquid products proves to be more complicated since it is difficult to homogeneously mix a liquid phase in a gas phase at a high temperature and at a high speed from a blown plasma arc torch. This difficulty further reduces the thermal yield and efficiency of the method.

Another example of the use of blown arc plasmas is shown in documents [2] and [3]. The wastes to be destroyed are introduced into a tubular torch with a blown arc plasma after having been subjected to a change of state into a gas phase by means of an initial burner.

In the technique discussed in document [2], the fact of vaporizing the feed in order to have it pass into the plasma torch, gives the possibility of both increasing the destruction efficiency of the method and considerably complicates the method, since it imposes constant monitoring of proper vaporization of the feed. Addition of a gas burner, which requires a substantial air supply in order to operate properly, leads to a large gas flow rate in which the mass proportion of the feed is reduced.

The method described in document [3] allows introduction of the feed to be destroyed, whether it be liquid or gaseous, directly into the plasma torch. This method uses the technology for stabilizing the electric arc in the torch by means of an electromagnetic field. As this method is a substantial consumer of electrical energy, it is reserved to destruction of products present in a very large amount. Further, no mention is made of the type of gas used for operating the torch or for controlling atomic recombinations. Thus, this method carries out destruction of the products by pyrolysis, i.e. without any oxygen supply, which leads to strongly reducing gases being obtained which have to be burned at the outlet of the torch before being discharged into the atmosphere.

In document [4], the wastes are mixed with water or with methanol and are introduced into a tubular arc torch. Oxygen, instead of air is also used as a plasma gas. The purpose of these modifications is to improve the efficiency of destruction of the wastes. In this document, a tubular segmented arc torch is used. This is a relatively uncommon technology which requires good knowledge of plasma technology in order to define stable operating parameters. The use of two phases, a liquid and gas phase, in this type of technology does not facilitate the establishment of stable operation.

In document [5], a plasma burner is used for purifying and cleaning up gases flowing out of a conventional incinerator. High temperature post-combustion with injection of air in the mixing chamber with gas products to be neutralized is thereby achieved. Again, with this method, the plasma torch is used as an extra energy carrier for purifying gases. Therefore, it is not possible to treat liquids directly without having vaporized them beforehand in a conventional incinerator for example.

Moreover, the fact of not introducing the feed within the torch, for material incompatibility reasons, strongly reduces the efficiency of the method.

It is also possible to use radiofrequency or high frequency plasmas. For example, in document [6], the solid products to be destroyed are first introduced into a rotary kiln so as to be transformed into a gas form. The gas flow is then directed towards a collector where it is mixed with a carrier gas and optionally with liquid wastes. This mixture is then introduced into a high frequency plasma torch. The products from the torch then pass into a centrifuge provided with a toric system for generating electric and magnetic fields. With this system, it is then possible to separate the different elements.

This technique has as a primary purpose, the separation of the different constituents of feeds with optional recovery of recyclable valuable products such as heavy elements.

The torch has a particular geometry into which the feeds are introduced via an undefined collector. The attained field temperatures which are from 300 to 1,000° C. do not allow destruction in the strict sense of the term but rather allow conditioning for separation of the different elements.

Document [7] relates to the destruction of toxic gas products of military origin by means of a plasma torch operating under an air/argon mixture.

At the outlet of the torch, an air/water quenching mixture is introduced in order to stop the reactions. The feeds to be destroyed either pass into an inerting module, or into the plasma module. Thus, it appears that it is mainly the gases that are directed towards the plasma module. The introduction of liquid is only a possibility depending on the composition of the feed.

Most methods for destroying wastes as described above use plasma arc torches which are positioned in specific reactors and for which the waste destruction efficiency is insufficient.

This is why, in order to substantially improve these destruction efficiencies, a method was developed in which a liquid or powdery organic or organo-halogenated compound to be destroyed is mixed with water and introduced with a plasma-forming gas into the core of an inductive plasma torch. In other words, this method is based on the use of an induction plasma torch into the inside of which the feed of compounds to be destroyed is introduced. This method ensures destruction of the feed by introduction of water which is sprayed into the plasma with the compounds to be destroyed.

This method is described in document FR-A1-2866414 (8) and the device for its application is illustrated in FIG. 1.

This device comprises an induction plasma torch supplied with a plasma gas (1) ionized by means of an inductor (2) in order to thereby form a plasma (3).

This torch is equipped upstream with a system (4) for introducing the feed to be treated. In order to ensure compliant destruction of the feed, water is mixed with the introduced feed (5).

Dissociation of water at a very high temperature ensures the oxygen supply required for oxidizing the organic or organo-halogenated species on the one hand and a hydrogen supply required for forming HCl on the other hand.

The first claim of document [8] indicates on this matter that the organic product is mixed with water in a sufficient amount in order to at least satisfy the stoichiometric ratios between the carbon and oxygen atoms of the mixture, or that the organo-halogenated product is mixed with water in a sufficient amount in order to at least satisfy the stoichiometric ratios between the carbon and oxygen atoms of the mixture on the one hand, and between the hydrogen and halogen atoms of the mixture, on the other hand.

Indeed, a lack of hydrogen in the medium may be at the origin of the production of undesirable molecules such as phosgene $COCl_2$. The plasma (3) generates many highly reactive ionic species which ensure the destruction of the organic compounds. These destruction reactions occur in the reactor (6) which is maintained at a very high temperature thanks to refractory materials (7) which line its internal walls (8).

Introduction of air and/or oxygen (9, 10) at the bottom of the reactor and at a venturi (11) ensures significant mixing of the gases and an additional supply of oxygen.

Next, the gases are rapidly cooled before entering a recombination area (12) in which the last reactions occur.

The gases are then directed (13) towards a treatment notably consisting in neutralization of the acid species.

A pilot installation was set into place in order to test the efficiency of the method described in document [8]. The power of the plasma generator is 4.5 kW for an effective power in the plasma from 1 to 1.5 kW.

If degradation of the products is very satisfactory, the energy efficiency of the method may be described as average or even poor, because of the large amount of water to be heated and to be volatilized.

Two reference molecules, taken as an example, were treated in the pilot installation in which they were each supplied at a rate of 100 g/h:
trichloromethane or chloroform of formula $CHCl_3$,
chlorobenzene of formula $C_6H_5Cl$.

Treatment of chloroform requires a water supply of a minimum of about 30 g/h for a treatment heat balance of about 100 W. The power available in the torch is thus widely sufficient for ensuring complete treatment of the solvent.

Treatment of chlorobenzene requires a water supply of a minimum of about 200 g/h for a treatment heat balance of about 550 W. If the power in the plasma is still sufficient, the available margin is more limited. If the amount of water is brought to twice the stoichiometry for securing, guaranteeing the treatment, the heat balance increases to approximately 900W which reduces the energy margin to almost 0.

Being aware that for reasons of reaction efficiency, it is reasonable to work with at least double water stoichiometry, the energy yield is widely reduced.

As an illustration, FIG. 2 illustrates the time-dependent change in the maximum treatment flow rate of an aliphatic chlorinated solvent $C_xH_yCl$ per available kW in the plasma.

It should be noted that the calculations were carried out with solvents comprising aliphatic chains with a single chlorine atom ($z=1$). But the conclusions would be identical with a number of chlorine atoms z different from 1.

It appears that this flow rate substantially decreases with the number of carbon atoms x, which makes the method moderately or not very attractive for a large scale industrial application.

From the foregoing, it therefore emerges that the method and the device which are described in document [8] have certain drawbacks which are notably the following:
an insufficient energy yield of the method;
a limited feed rate;
the use of a costly plasma gas such as argon which makes the method not very interesting within the scope of an industrial application;
difficulties for treating and destroying compounds which are non-miscible with water.

Therefore, there exists a need for a method and a device for destroying a feed comprising at least one organic compound by means of at least one induction plasma formed by at least one plasma-forming gas ionized by an inductor, which do not have the drawbacks of the method and of the device described in document [8].

The goal of the present invention inter alia is to provide a method and a device for destroying a feed comprising at least one organic compound by means of at least one induction plasma formed by at least one plasma-forming gas ionized by an inductor which inter alia meet this need.

The goal of the present invention is further to provide such a method and such a device which do not have the drawbacks, defects, limitations and disadvantages of the methods and devices of the prior art such as the method and the device described in document [8].

DESCRIPTION OF CERTAIN INVENTIVE ASPECTS

This goal and still other ones are achieved according to the invention by a method for thermal destruction of at least one feed comprising at least one organic compound by at least one induction plasma formed by at least one plasma-forming gas ionized by an inductor, wherein the following successive steps are carried out;

a) said feed is introduced into the plasma, and a supply of oxygen gas is achieved in said at least one plasma-forming gas, and/or in the plasma or in the vicinity of the plasma, by means of which gases are obtained in which decomposition into atomic elements has been induced;

b) in a reaction enclosure, a first operation for thermal destruction of said gases in which decomposition into atomic elements has been induced, is carried out;

c) a second operation for thermal destruction of the gases having undergone the first operation for thermal destruction is carried out, by mixing of said gases with air and/or with oxygen;

d) a recombination is achieved by cooling at least one portion of the gases from the mixing;

e) the gases are discharged.

Advantageously, the supply of oxygen gas may be achieved by using pure oxygen as a single plasma-forming gas.

In other words, the plasma-forming gas(es) is(are) then composed of pure oxygen.

It is then generally not necessary to achieve a supply of oxygen gas in another way, for example by bringing oxygen gas into the plasma or into the vicinity of the plasma.

If the plasma-forming gas(es) is(are) not composed of oxygen, does(do) not comprise oxygen or comprise(s) little oxygen, the supply of oxygen gas may then be achieved by bringing oxygen gas into the plasma (already formed) or into the vicinity of the plasma (already formed).

By plasma, is meant the plasma already formed, already made up. The plasma already formed, already made up, should not be mistaken for plasma-forming gas(es).

By plasma-forming gas(es) comprising little oxygen, is generally meant that the amount of oxygen in the plasma-forming gas(es) is not sufficient for having decomposition into atomic elements and the first and second thermal destruction operations occur under satisfactory conditions.

Advantageously, when the plasma gas(es) is(are) not composed of oxygen, does(do) not comprise oxygen or comprise(s) little oxygen, the supply of oxygen gas may be achieved by introducing oxygen gas into the plasma at a location identical or close to the location where the feed is introduced, and simultaneously with the latter.

Advantageously, the molar ratio of the oxygen gas supplied to the organic compound(s) is greater than the stoichiometric combustion ratio.

Advantageously, in step c), mixing may be achieved with a venturi device into which air and/or oxygen gas is(are) injected.

Generally, air and/or oxygen gas is systematically injected at the mixing and there is cooling at the mixing.

Or else, notably but not only, in the case when the feed further contains at least one mineral filler, in step c), the mixing may be achieved by an air and/or oxygen distribution ring which injects air and/or oxygen gas towards the main axis of the reaction enclosure.

Advantageously, at the end of step d), at least one step d1) may be provided for chemical treatment of the gases.

Advantageously, said at least one step d1) for chemical treatment of the gases is selected from a dehalogenation or neutralization step, a step for deoxidation of nitrogen oxides and a desulfuration step.

Advantageously, when the feed further contains at least one mineral filler, a gas filtering step may be provided after step d) and before step d1).

Advantageously at the end of the step for chemical treatment of the gases d1), the gases may be treated in a droplet catcher condenser.

Advantageously, several either identical or different feeds may be treated with several plasmas.

The method according to the invention may be defined as a modification or rather as an improvement of the method described in document [8].

According to the invention, the method of document [8] was modified in order to apply as an oxidizer, comburent, oxygen instead and in place of water.

In other words, the modification of the method of document [8] which is the object of the present invention mainly consists of adapting the method of document [8] so that it only operates with pure oxygen as a plasma-forming gas which then has the dual function of a plasma-forming gas and of an oxidizing, comburent, gas; or else with a plasma-forming gas comprising no or little oxygen and with an oxygen supply.

In other words, according to the invention only the feed is introduced into the plasma and the feed is not mixed with water before its introduction into the plasma, as this is the case in document [8].

In the method according to the invention, destruction of the organic compounds is ensured by the introduction, arrival, admission, supply of oxygen gas. This introduction may ideally be ensured by the plasma, in the case when pure oxygen is used as a single plasma-forming gas (see FIG. 6).

Or else, this introduction of oxygen may be ensured via an auxiliary inlet, the plasma then being composed of one or several other gases not comprising oxygen or comprising little oxygen (see FIG. 7).

The method according to the invention includes a series of specific steps which has never been described or suggested in the prior art.

In particular, implementation in a method for thermal destruction of wastes using an induction plasma, of oxygen as an oxidizer, comburent, instead of water, has never been described or suggested in the prior art and notably in document [8] mentioned above.

The method according to the invention does not have the drawbacks, defects, limitations and disadvantages of the methods of the prior art and provides a solution to the problems of the method of the prior art and notably of the methods of document [8].

It should first of all be noted that replacement of water with oxygen globally has only little impact on the application of the method.

The method according to the invention may therefore be applied in existing installations provided for operating with water as an oxidizing, comburent, gas, without it being necessary to deeply modify these installations.

Only slight adaptations should possibly be made so that oxygen is used as an oxidizer instead of water.

More specifically, if the interest lies in the treatment of organo-halogenated compounds, it is known that the treatment of organo-halogenated products with water is justified in order to avoid formation of highly toxic compounds such as phosgene $COCl_2$. This compound is formed under a reducing condition between the chlorine atoms and the CO radicals. Introducing water imposes a certain hydrogen potential required for binding these chlorine atoms in order to produce hydrochloric acid HCl which is neutralized downstream in a washing column as this is described in document [8].

Introducing oxygen into the system, like this is the case in the method according to the invention, imposes more oxidizing conditions but limits the binding capabilities of chlorine.

A study conducted on the molecule $CHCl_3$, highly loaded with chlorine shows that for treating one mole of product, the amount of $COCl_2$ formed depends on the amount of introduced oxidizer, comburent. Below the ratio 1/1, it appears that phosgene is formed in both cases with a maximum amount 3 times greater during a treatment with oxygen. On the other hand, when the ratio is greater than 1/1, phosgene no longer forms. In the case of the treatment with water, beyond this ratio, the hydrogen potential is sufficient for reacting with the chlorine in order to form HCl which will be neutralized subsequently. In the case of the oxygen treatment, beyond this ratio, the oxygen potential is sufficient for gasifying the totality of the carbon in the form of $CO_2$.

The conclusion is that regardless of the oxidizer, comburent, used, phosgene is formed under sub-stoichiometric conditions. When the stoichiometry is exceeded, this toxic compound disappears. FIG. 3 illustrates this result through the treatment of 1 mole of chloroform.

The difference between both operating modes lies in the formation of chlorine $Cl_2$ during treatment with $O_2$ as this appears in FIG. 4. In the case of a treatment with water, this amount is reduced to zero when the ratio attains 1/1.

It might be believed that in the method according to the invention operating with oxygen, the installation for treating the gases, initially designed and proportioned for neutralizing hydrogen chloride HCl, should be modified and re-proportioned in order to ensure neutralization of chlorine gas $Cl_2$.

Now, it is found that the latter is easily neutralized by a washing column with soda while forming sodium chloride and sodium hypochlorite NaClO. The gas treatment system initially in place in the installation operating with water therefore does not have to be modified. Only the management of the effluents downstream will generally have to take into account the presence of this hypochlorite.

The method according to the invention has many advantages relatively to the methods of the prior art, and notably to the method of document [8], advantages which are notably generally related to the replacement of water with oxygen in order to ensure combustion of the organic materials, compounds, whether oxygen constitutes the plasma-forming gas or not. These advantages are notably the following:

a very substantial improvement in the energy yield of the method;

the possibility of treating all types of feeds and even liquid feeds non-miscible with water, which was possible with difficulty with the method described in document [8]. With the method according to the invention, such liquids may be easily introduced into the plasma and treated. The range of feeds which may be treated by the method according to the invention is therefore very extended and has almost no limitations;

a substantial increase in the feed level for a same size of equipment.

The advantages of the method according to the invention are even more numerous and even more notable in the case of a preferred embodiment of the method according to the invention where pure oxygen is used as a plasma-forming gas, i.e. in the case when water is replaced with oxygen which is also used as a plasma-forming gas. These advantages, some of which have already been mentioned above, are notably the following:

first of all, the plasma-forming gases currently used are air, nitrogen or argon. The use of air or nitrogen leads to a significant production of nitrogen oxide which requires the setting up of a catalytic reduction column downstream generally using an ammonia solution. The use of argon as for it is costly for an industrial utilization.

In this preferred embodiment of the method according to the invention, the use of pure oxygen as plasma-forming gas, substantially less costly than argon and not leading to the production of nitrogen oxide is a solution of choice since, in addition to being the source of the plasma, it also ensures the oxygen supply required for combustion of the organic compounds. In other words, it plays both the role of a plasma-forming gas and of an oxidizing, comburent, gas. Nitrogen-free, it also avoids the setting up of an additional unit for neutralization of the corresponding oxides.

By using pure oxygen as a plasma gas, use of highly expensive argon for this purpose is notably avoided, which has a strong impact on the operating cost of the method.

improvement in the performance of the destruction of the wastes, effluents and optimization of the combustion of the gases;

the possibility as already specified above of treating liquid feeds non-miscible with water;

a substantial increase in the treatment capacity of the method.

More specifically, in the « water mode », i.e. in the case of the method of document [8], the method is highly « energy-consuming » which limits the treatment flow rates.

For example, in the case of treatment of compounds of the aliphatic hydrocarbons series $C_xH_yCl$, the power required for treating a flow rate of 100 g/h increases with the number x of carbon atoms. In the oxygen mode, combustion of the organic materials releases power. On the basis of a feed rate of 100 kg/h, this power substantially increases with the number x of carbon atoms.

The differences between both modes appear in FIG. 5. In the second case, the negative scale takes into account production of power. It is developed by the combustion of the solvents and has to be compensated by increasing the temperature of the reactor and optimizing the dissipation of the calories.

Within the scope of a large scale industrial operation, the power developed during the treatment may be utilized. For example, a unit for treating 50 kg/h of a compound similar to chlorohexane will develop a power close to 450 kW.

The invention further relates to a device for destroying at least one feed comprising at least one organic compound by at least one induction plasma formed by at least one plasma-forming gas ionized by an inductor, comprising:
- at least one inductive plasma torch;
- means for introducing at least one plasma-forming gas into said torch;
- optionally when the plasma gas(es) is(are) not composed of oxygen, comprise(s) no oxygen or comprise(s) little oxygen, means for bringing oxygen gas into the plasma or to the vicinity of the plasma;
- means for introducing said feed into said torch;
- a reaction enclosure, chamber, (7) capable of allowing thermal destruction of the gases flowing out of the inductive plasma torch (6);
- a device allowing mixing of the gases flowing out of the reaction enclosure, chamber (7) to be carried out;
- means for introducing air and/or oxygen gas (9) into the mixing device (8);
- a device (10) allowing recombination by cooling, of at least one portion of the gases from the mixing device (8);
- the inductive plasma torch (6), the enclosure, reaction chamber (7), the mixing device (8), and the recombination device (10) being in fluidic communication.

Advantageously, the means for introducing the feed into the torch may consist of a tube made of a refractory material, the inside of which is packed with a textile made of fibers of a refractory material.

Advantageously, said tube made of a refractory material may further comprise in its centre a tube for bringing oxygen gas into the plasma.

Advantageously, the device allowing gas mixing to be performed, may be a venturi.

Or else, the device allowing mixing of the gases to be carried out, may be a distribution ring which is capable of injecting air and/or oxygen towards the main axis of the reaction enclosure.

Advantageously, the device allowing recombination by cooling, of at least one portion of the gases from the mixing device, may be a water-cooled double-walled enclosure.

Advantageously, the device may further comprise, located downstream from the gas recombination device in the circulation direction of the gases, at least one device allowing chemical treatment of the gases from the recombination device.

Advantageously, said at least one device allowing chemical treatment of the gases from the recombination device may achieve at least one reaction selected from a dehalogenation, a deoxidation of nitrogen oxides and a desulfuration.

Advantageously, the device may further comprise filtration means downstream from the gas recombination device in the direction of circulation of the gases, and upstream from said at least one device allowing chemical treatment of the gases from the recombination device.

Advantageously, the device may comprise several plasma torches.

Advantageously, the device may be placed on a vehicle.

The invention will be better understood and other advantages thereof will become apparent upon reading the detailed description which follows, made as an illustration and not as a limitation, with reference to the appended drawings wherein:

A positive ordinate corresponds to power absorption and a negative ordinate corresponds to power production.

Figure 6:
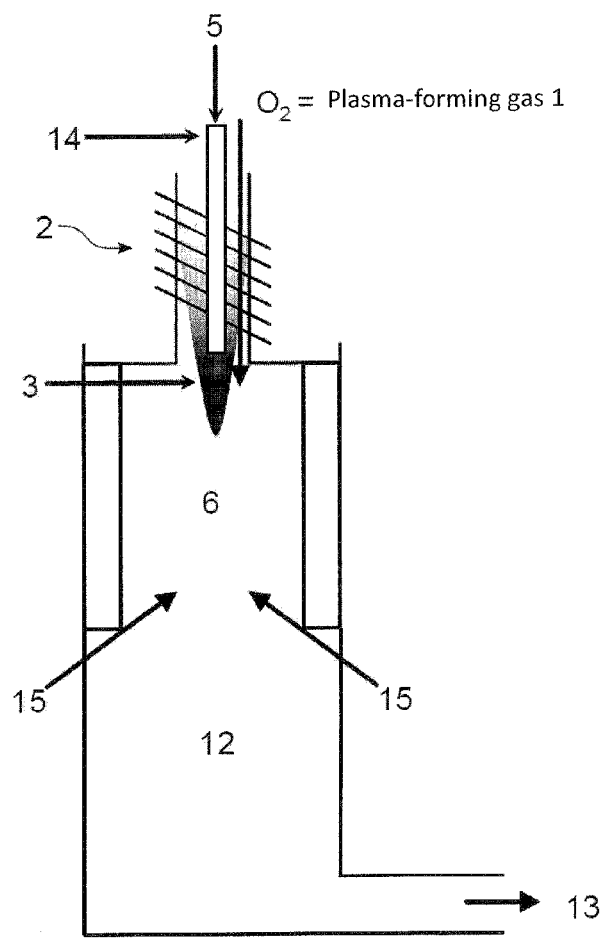

FIG. 6 is a schematic vertical sectional view of a device for carrying out the method according to the invention in an embodiment where the plasma-forming gas is composed of pure oxygen.

Figure 7:
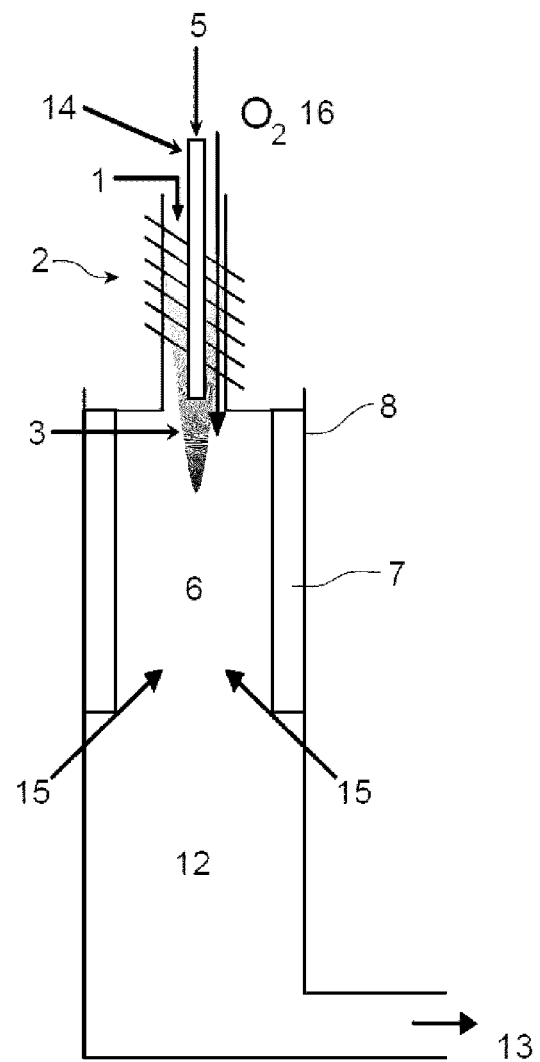

FIG. 7 is a schematic sectional view of a device for carrying out the method according to the invention in an embodiment where the plasma-forming gas comprises no oxygen or little oxygen.

Figure 8:
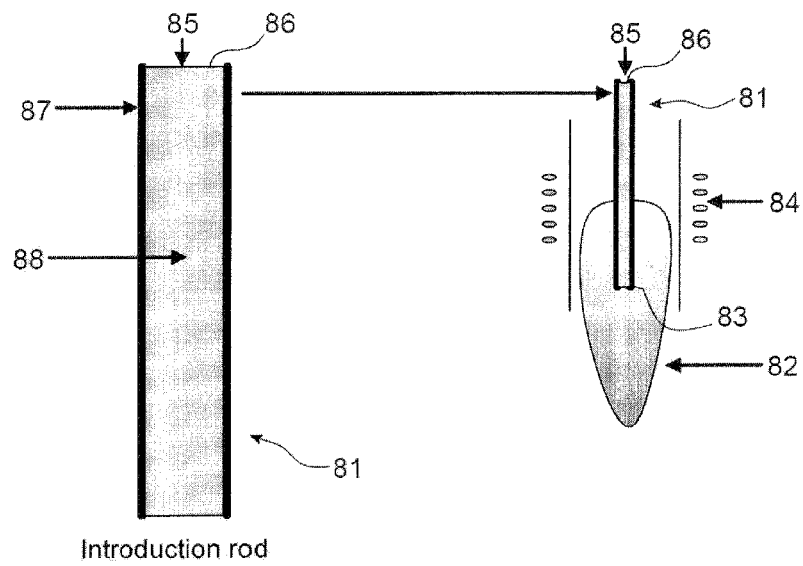

FIG. 8 is a schematic vertical sectional view showing the structure of a specific rod designed in order to introduce a fluid feed into the core of a plasma, and its application in a plasma torch.

Figure 9:
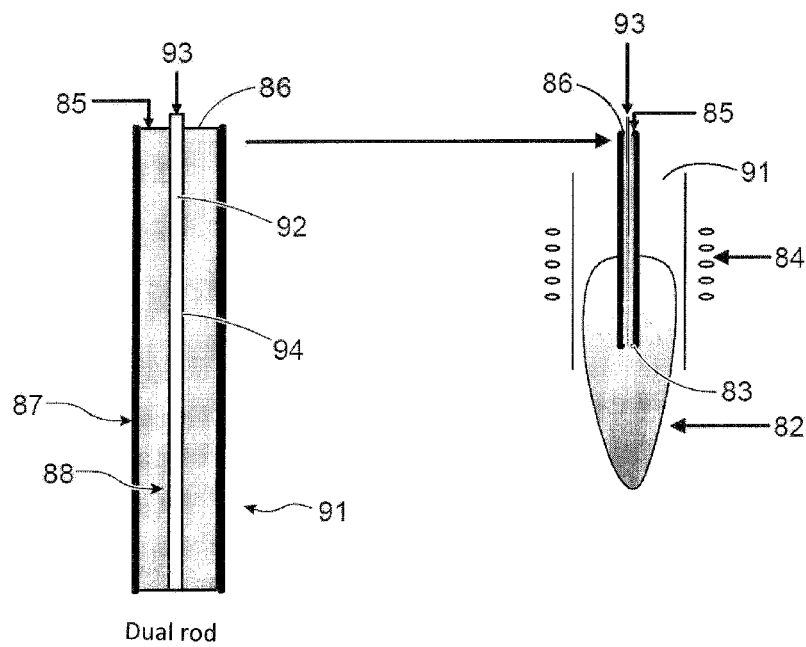

FIG. 9 is a schematic vertical sectional view showing the structure of a specific rod designed for introducing a fluid feed and an oxidizing gas, such as oxygen, into the core of a plasma, and its application in a plasma torch.

Figure 10:
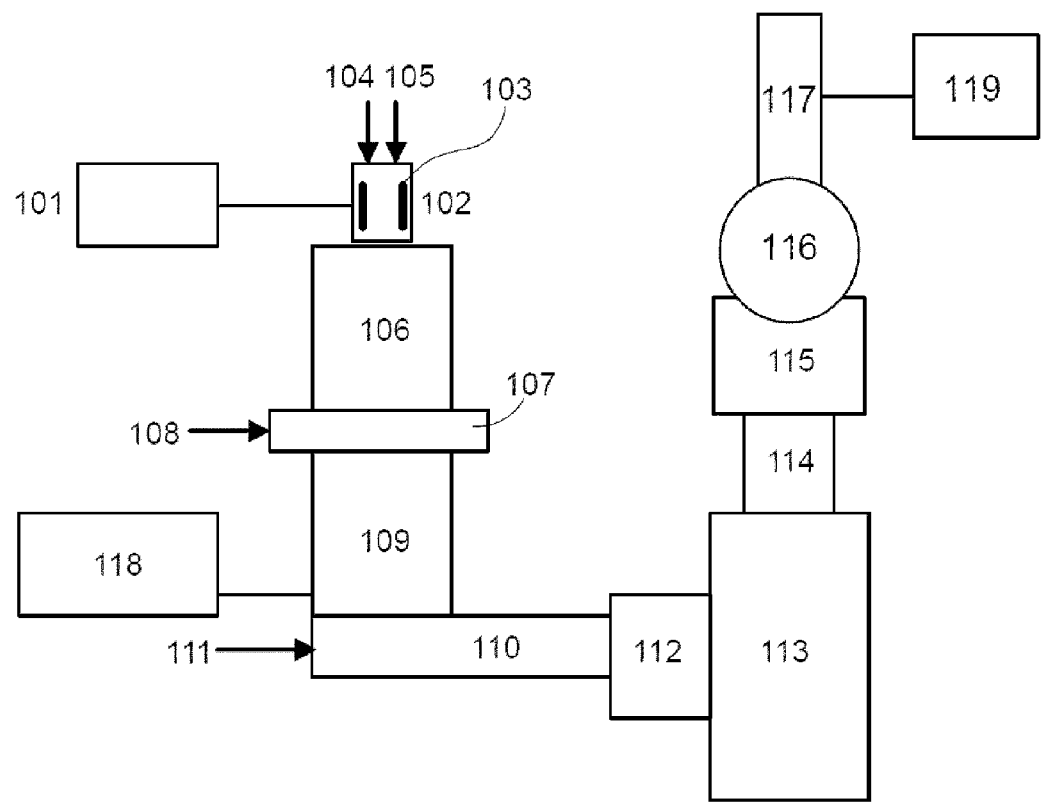

FIG. 10 is a schematic vertical sectional view which illustrates the whole of a device for carrying out the method according to the invention.

DETAILED DISCUSSION OF CERTAIN ILLUSTRATIVE EMBODIMENTS

Let us specify first of all that the method and the device according to the invention are defined as being a method and a device for thermal destruction of a load, feed, charge, comprising at least one organic compound.

Preferably, the feed is composed of (consists of) said at least one organic compound.

According to the invention, the treated feed is generally a fluid feed, i.e. it is in liquid, gas or powdery form (i.e. in the latter case it forms a flowable powder).

By organic compound is generally meant a compound comprising, preferably composed of, consisting of, carbon and hydrogen atoms and optionally atoms selected from oxygen, nitrogen, sulfur atoms and from halogen atoms such as chlorine, bromine, iodine and fluorine atoms.

The organic compound(s) to be destroyed are generally toxic, harmful or dangerous organic compounds for example explosive compounds; and/or radioactive compounds.

These compounds may for example be organo-halogenated solvents, notably organochlorinated solvents, oils, aromatic or aliphatic hydrocarbons, toxic gas products such as chlorofluorocarbons CFC or hydrochlorofluorocarbons HCFC, warfare gases, solid explosives etc.

A preferred feed which may be treated by the method according to the invention is a radioactive liquid feed comprising halogenated organic compounds, the structure of which includes radioactive tracers such as $^{14}C$ or $^{3}H$.

By destruction is meant that at the end of the method, i.e. generally in the discharge gases, the organic compounds initially present in the feed and the removal of which is sought are no longer present or present with a content of less than 10% by mass, preferably less than 5% by mass, or even that these compounds are no longer detectable and that their content may then be considered as zero. The organic compounds to be destroyed are transformed in the method into molecules of smaller size, for which the harmfulness, toxicity, dangerousness is less than that of the compounds to be destroyed, initially present in the feed, or even for which the toxicity, harmfulness may be considered as nil.

Figure 1:
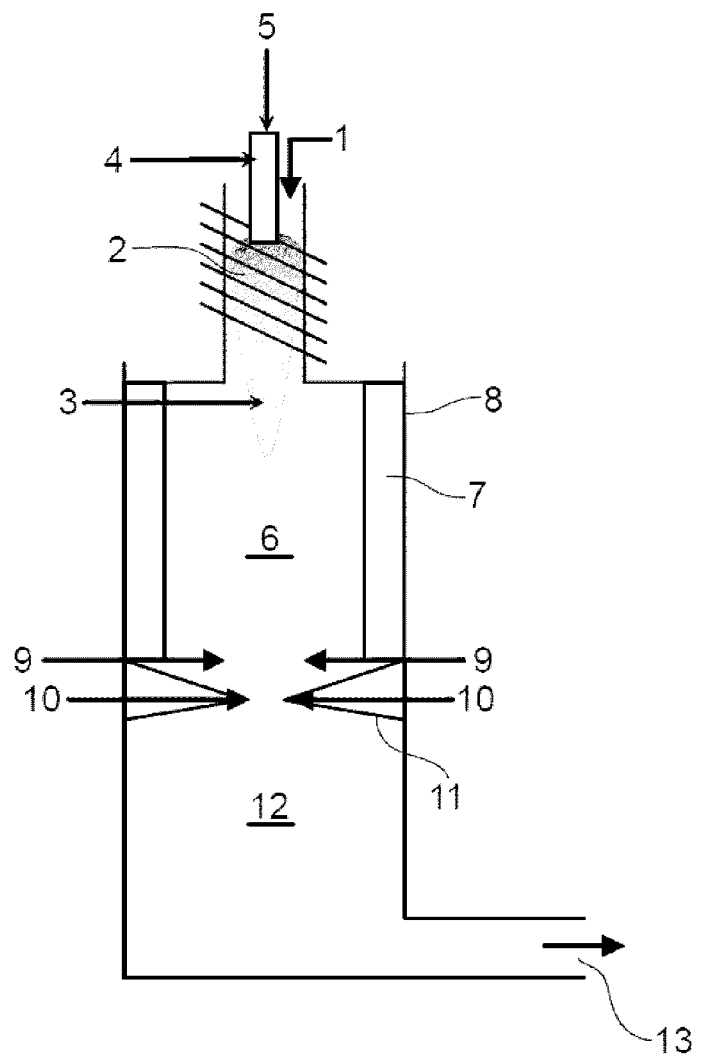
FIG. 1 is a schematic vertical sectional view of the device for carrying out the method described in document [8] which uses water as an oxidizer, comburent.
Figure 2:
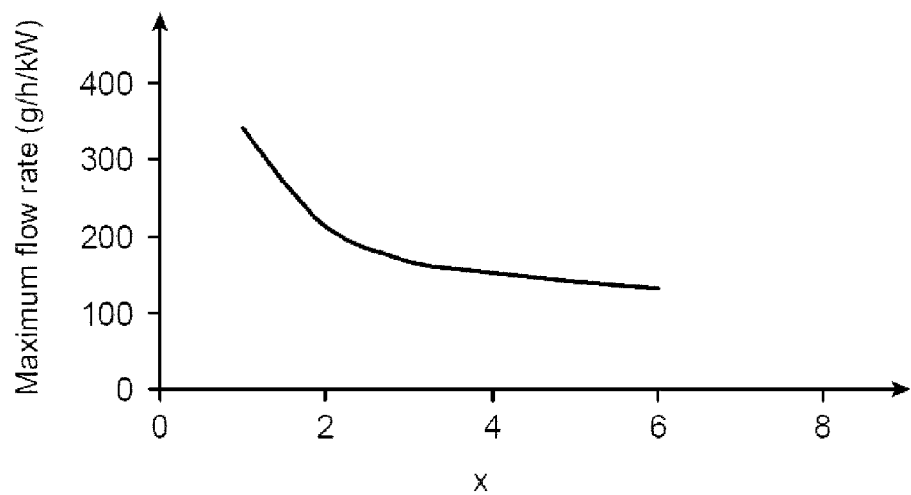
FIG. 2 is a graph which gives the maximum flow rate for treating $C_xH_yCl$ compounds with water as an oxidizer, comburent. The maximum treatment flow rate (in g/h/kW) is plotted in ordinates and the number of carbon atoms x of the compound is plotted in abscissae.
Figure 3:
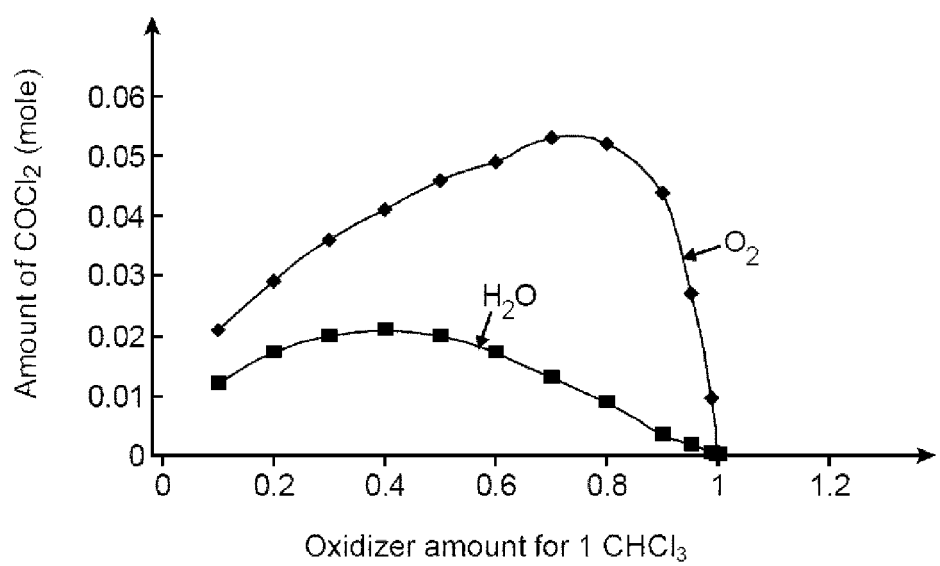
FIG. 3 is a graph which shows the change in the formation of phosgene $COCl_2$ versus the amount and the nature of the oxidizer, comburent, used, respectively water or oxygen, during destruction of chloroform. The amount of formed $COCl_2$ (in moles) is plotted in ordinates and the amount of oxidizer, comburent, for one mole of chloroform is plotted in abscissae.
Figure 4:
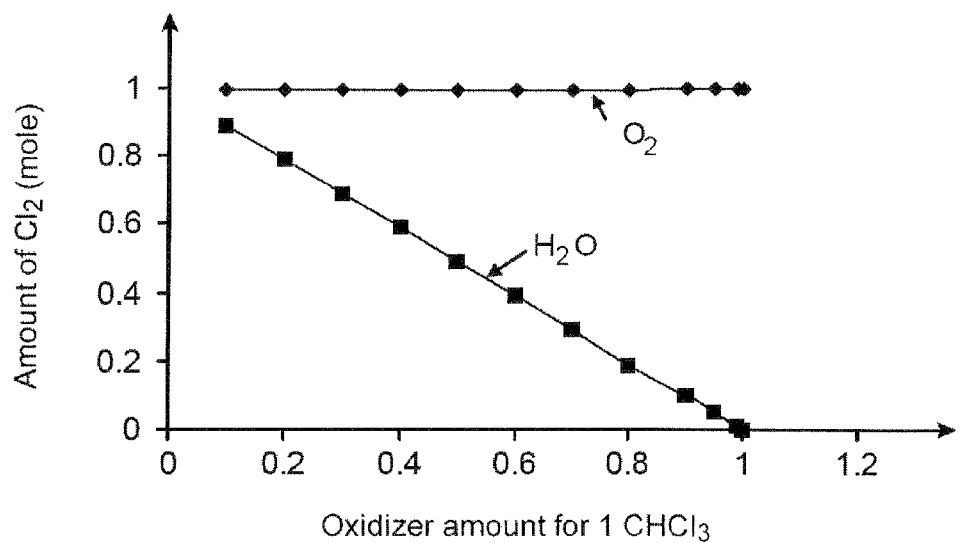
FIG. 4 is a graph which shows the change in the formation of chlorine $Cl_2$ versus the amount and the nature of the oxidizer, comburent used, water or oxygen respectively, during the destruction of chloroform. The amount of formed $Cl_2$ (in moles) is plotted in ordinates and the amount of oxidizer, comburent for one mole of chloroform is plotted in abscissae.
Figure 5:
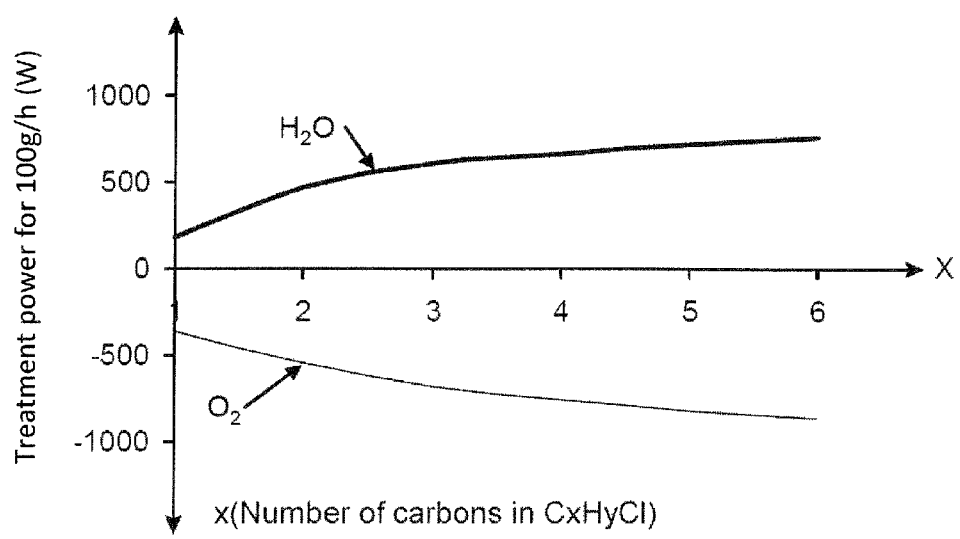
FIG. 5 is a graph which shows the power required for treating 100 g/h of a compound $C_xH_yCl$ versus the number of carbon atoms x of the compound, for water and oxygen oxidizers, comburents, respectively. The treatment power for 100 g/h (in W) is plotted in ordinates, and the number of carbon atoms x of the compound $C_xH_yCl$ is plotted in abscissae.

FIG. 6 illustrates a device for carrying out the method according to the invention in an embodiment where the plasma-forming gas is composed of, consists of, pure oxygen. The device of this figure is substantially similar to the one of FIG. 1 (the same reference symbols are used), however except that the oxygen is used as plasma-forming gas and is introduced into the reactor through the duct (1) opening out into the plasma torch, and that only the feed to be treated (5) is introduced, fed, into the plasma and not a mixture of the feed and of water. Further, advantageously, the introduction, feeding, system (4) of the device of FIG. 1 may optionally be replaced in the device according to the invention by a specific introduction rod, tube (14), and/or the venturi (11) of the device of FIG. 1 may be suppressed and replaced by a gas distribution ring for injecting air and/or oxygen (15) towards the centre of the reactor as this is described in more detail below.

FIG. 7 illustrates a device for carrying out the method according to the invention in an embodiment wherein the plasma-forming gas is not pure oxygen, or wherein the plasma-forming gas(es) comprise(s) no oxygen or little oxygen.

It is therefore necessary to provide an oxygen supply which may be accomplished by directly bringing the gas into the core of the reactor or by bringing it simultaneously and jointly with the feed for example the liquid or gas feed to be treated. In the first case, and as this is illustrated in FIG. 7, tapping of a traditional type (16) gives the possibility of ensuring the arrival of oxygen into the reactor as close as possible to the plasma or into the plasma, while another separate duct (1) allows introduction of a plasma-forming gas into the plasma torch. As for the remainder, the device of FIG. 7 is substantially similar to the one of FIG. 6.

FIG. 10 shows the whole of a device for carrying out the method according to the invention.

From upstream to downstream, the installation is equipped with an induction plasma torch (102) powered by an electric generator (101) connected to the mains (380V/50 Hz) which delivers a high frequency current adapted to the geometry of the torch (102).

Supplying power to the torch (102) with the generator (101) is generally accomplished via a control panel (not shown).

Starting of the torch (102) is ensured at atmospheric pressure by setting up tungsten filaments (103) in the torch (102) which, when they are subjected to the high frequency electromagnetic field, initiate the plasma.

In the case of an oxygen plasma, the starting may be accomplished according to other means avoiding oxidization of the electrodes.

The torch (102) generally consists of one single coil, of a turn, generally cooled by air, which is supplied with oxygen by means of suitable inlets (104) and which is supplied with a feed by suitable means (105) which introduce the feed into the inside of the plasma.

Preferably and notably in the case when the feed is liquid, the means for introducing the feed into the plasma consist of a specific rod for introducing liquids into the core of the plasma.

This specific rod, tube is illustrated in more detail in FIG. 8.

Indeed, a plasma is a viscous medium into which it is difficult to introduce fluids.

The rod (81) plunges into the core of the plasma (82) and opens out (83) into the lower portion of the single inductive coil, inductive turn (84) where the feed (85) sent from the top (86) of the rod is thereby introduced.

If reference is made to FIG. 8, this rod consists of:
- a tube (87) made of a refractory material such as alumina, which ensures the mechanical structure;
- a packing or wick (88) composed of a textile made of fibers of a refractory material such as a glass, alumina, or zirconia in which the feed (85), generally fluid, is introduced through one of the ends of the rod, which is generally its upper end (86) because the rod is generally positioned vertically.

In this structure, the textile fibers packing (88) prevents the formation of drops falling through the plasma (82). It ensures a regular flow rate by capillary impregnation.

When the fluid is a liquid, the high temperatures attained by the rod in its middle portion ensure vaporization and the organic material is essentially treated in gas form.

However, this rod may also be used with fluids which are not liquid.

As this was already indicated above, the provision, supply of oxygen may be accomplished in several ways. Thus, in the case when the plasma-forming gas is composed of oxygen, then the oxygen supply naturally consists of the supply of this plasma-forming gas (FIG. 6).

Or else, if the plasma-forming gas comprises no oxygen or little oxygen, then the provision, supply of oxygen may be accomplished by bringing the oxygen gas directly into the core of the reactor or by bringing it together with the feed.

In the first case, a tapping of the traditional type ensures arrival of oxygen into the torch which produces the plasma (FIG. 7).

The feed is brought into the plasma through the rod described in FIG. 8.

In the second case, oxygen may be brought in via the rod described above and in FIG. 8, this rod being modified so as to allow passage of oxygen.

This modified rod or dual, double rod (91) is shown in FIG. 9.

As oxygen cannot be mixed with the organic compounds of the feed before their arrival into the reactor for safety reasons, a tube, generally a capillary tube (92), may be set up in the center of the rod (91) which retains its textile or fibrous packing (88) described above. The oxygen (93) is then introduced into the capillary (92) while the feed (85) comprising the organic compounds is introduced through one of the ends of the rod, generally its upper end (86) at the periphery in the annular space defined between the wall (94) of the tube bringing the oxygen and the wall (87) of the rod.

The plasma formed in the plasma torch (102) burns in a reactor or in a reaction enclosure (106).

This reaction chamber (106) generally includes a double wall in which the cooling water circulates. This double wall may be made of steel. The inner surface of the double wall is covered with a protective refractory material.

The external walls of the reactor are generally cooled by circulation of water.

The chemical species from the plasma oxidized in the reactor, reaction enclosure, (106) by means of the oxygen introduced into the torch (102) notably when pure oxygen is used as a plasma-forming gas. The reaction chamber has the function of confining the heat produced in the plasma torch in order to thereby allow complete destruction of the waste. The gas from this reaction enclosure may thus attain a temperature above 1,500° C.

The reaction chamber is generally in the form of a vertical cylinder shape at the top of which is positioned the plasma torch. Generally, the walls of the reaction enclosure are thermally insulated by a refractory material.

Said oxidation is promoted by means of a mixing device (107) such as a venturi, located at the lower portion of the reaction enclosure. An introduction of oxidizing, comburent gas for example air and/or oxygen (108) may be provided at this device.

In the case when the mixing device is a venturi, there is always introduction of air and/or of oxygen into the mixing device.

If the venturi is suppressed, only an introduction of air and/or oxygen by means of a distribution ring is retained.

The structure of the venturi is described in detail in document [8] to the description of which reference may be made.

The venturi by means of a supply of oxidizing gas such as air and/or oxygen allows generation of a second combustion or post-combustion between this oxidizer, comburent and the gases from the reaction enclosure. With this device it is thus possible to destroy the compounds, notably the toxic compounds which would have escaped the first destruction stage in the reaction enclosure (106).

In other words, the purpose of the venturi is to generate significant turbulence of the reaction gases from the reaction chamber (106) by means of a cold air and/or oxygen supply (108). This mixture of gases consisting of cold air and/or oxygen and reaction products, allows without any provision of additional heat, generation of post-combustion of the gases from the reaction chamber. It is thus possible to complete the destruction of the possible reactive gases which have not been transformed in the reaction chamber (106). In the venturi, the different gas species such as $H_2$, CO, C . . . will react with air according to the following reaction:

$$CO+H_2+O_2 \rightarrow CO_2+H_2O$$

The harmful gas CO is thus transformed into a less harmful gas.

It may be stated that the venturi notably ensures mixing for improving the recombination rates, speeds and cooling by addition of air and/or oxygen (108).

In the case when the fluid includes mineral fillers, the venturi is suppressed, introduction of air also ensures quenching of the gases and of the particles found therein.

According to the invention, the geometry of the reactor, reaction enclosure, may be modified, at the mixing device (107), in order to allow the reactor to more easily accept mineral fillers.

Indeed, the method according to the invention is generally dedicated to the treatment of fluids without any mineral fillers.

However, for example, the treatment of used solvents having been used for dissolving materials containing minerals results in the concentration of these mineral fillers in the form of particles which may form deposits.

The presence of the venturi, present in order to ensure substantial mixing of the gases risks being at the origin of the formation of deposits and of a plug. This is why the treatment of liquids loaded with minerals should preferably be carried out with a reactor of a different design.

In this embodiment, the venturi is removed in order to avoid unwanted deposits at its level. It is replaced by a ring for distributing gases, for example air which may be enriched in oxygen. Said ring injects air and/or oxygen towards the axis of the reactor (which generally appears as a vertical cylinder) in a direction which may be tilted upwards. This tilt will depend on the geometry of the reactor and on the power of the plasma torch used. It may range from 0° to 70° relatively to the horizontal depending on the case.

The gas, the injection pressure of which may be modulated according to the geometry of the reactor and the power of the plasma, will have the function of generating a rupture area in the flow and of imposing the turbulence required for proper mixing. It will also ensure quenching of the gases and of the liquid particles which may be found therein in order to limit the formation of coherent deposits which may degrade the operation of the method. The gas distribution ring ensures post-combustion as this is the case in the venturi.

The treatment of liquids which may contain mineral fillers should involve a filtration step downstream from the reactor. A filter (112) will therefore have to be introduced into the chain for treating gases.

This configuration of the reactor with a gas distribution ring is shown in FIGS. 6 and 7. The additional filter is not illustrated but is included in the treatment of the gases.

Downstream from this mixing device (107) the gases penetrate into a cooler (109) which brings the gases to a temperature compatible with the treatment device positioned downstream.

This cooler (109) also allows the gases to finish their recombination process which has already begun in the venturi. By recombination is meant that the organic compounds which have been destroyed in the plasma, oxidized by oxygen, are recombined in small molecules forming a gas which may generally be discharged into the atmosphere after treatment, for example, a neutralization treatment for removing certain species such as HCl or $Cl_2$.

This cooler (109) which may also be called a recombination space, generally consists in a double wall chamber cooled by water. In this space, the temperature of the gases rapidly drops so as to attain for example 200° C. at the outlet. Unlike the reaction enclosure (106), the recombination space is not thermally insulated and its double wall is cooled by circulation of water from a central cooling unit. In this space, the gases flow and cool by natural convection close to the walls.

At the outlet of the cooler, or recombination space (109), the gases are analyzed for example by mass spectrometry or by infrared spectroscopy (118). With this analysis it is possible to check the efficiency of the heat treatment and to know the composition of the gases after this heat treatment, but especially with the analysis, it is possible to know whether the gases additionally have to undergo at least one chemical treatment.

The temperature of the gases may be adjusted by spraying water (111) at the inlet of an « oversleeve » (110) before directing the gases towards the gas treatment installation (113). It is thus possible to lower the temperature of the gases in the case of excess heat notably for protecting the system for neutralization of the halogens.

This gas treatment installation (113) is adapted according to the compounds which have to be treated. In this installation, it is possible to carry out one or several chemical treatments of the gases, selected for example from a dehalogenation treatment or treatment for removing the halogens, a treatment for removing nitrogen oxides, and a desulfuration treatment.

Generally the installation for treating the gases (113) may thus comprise a unit for neutralizing the halogens and/or a so-called « DENOX » system allowing catalytic denitrification of the gases notably in the case when the plasma-forming gas comprises nitrogen, and/or optionally a desulfuration unit.

Neutralization of the halogens present in the form of HCl or of chlorine gas is carried out generally by standard washing with spraying of soda water according to the following reaction:

$$HCl + NaOH \rightarrow NaCl + H_2O,$$

or according to the following reaction:

$$Cl_2 + 2NaOH \rightarrow NaCl + NaClO + H_2O$$

Denitrification of nitrogen oxides is for example carried out by reaction with ammonia:

$$NO + NO_2 + 2NH_3 \rightarrow 2N_2 + 3H_2O$$

$$4NO + 4NH_3 + O_2 \rightarrow 4N_2 + 6H_2O$$

$$2NO_2 + 4NH_3 + O_2 \rightarrow 3N_2 + 6H_2O$$

In the case when the effluents are loaded with minerals, these gases as this has already been specified above, pass through a filter placed upstream (112) of the washing system (113).

When the effluents are radioactive, this filter (112) will be of the VHE (« Very High Efficiency ») type.

This type of filter is currently distributed commercially.

Once they are washed, the gases pass through a droplet catcher condenser (114) with which the transport of liquid towards the element (116) and the chimney (117) may be limited.

The gases circulate in the installation from upstream to downstream by means of an extractor (115) maintaining a slight depression in the system.

On-line analysis means (118, 119), for example of the infrared spectroscopy or mass spectrometry type, ensure monitoring of the quality of the gases at the outlet of the cooler (109) and at the chimney (117) in order to determine every time whether the gases may be discharged into the atmosphere.

Finally, it should be noted that several plasma torches may be placed on a same reactor. This arrangement may allow treatment of substantial flow rates of fluids and/or simultaneous treatment of different immiscible or chemically incompatible fluids.

Further, the device according to the invention may be a mobile device, placed on a vehicle.

REFERENCES

[1] U.S. Pat. No. 4,438,706
[2] U.S. Pat. No. 4,479,443
[3] U.S. Pat. No. 4,644,877
[4] U.S. Pat. No. 4,886,001
[5] U.S. Pat. No. 5,505,909
[6] U.S. Pat. No. 5,288,969
[7] FR-A-2765322
[8] FR-A-2866414

What is claimed is:

1. A method for thermal destruction of at least one feed comprising at least one organic compound by at least one induction plasma formed by at least one plasma-forming gas ionized by an inductor, wherein the following successive steps are carried out:
    a) introducing only said feed into the plasma and achieving a supply of oxygen gas in said at least one plasma-forming gas, and/or in the plasma or in the vicinity of the plasma, by means of which gases are obtained in which decomposition into atomic elements can be induced, wherein said feed is not mixed with water before its introduction into the plasma;
    b) in a reaction enclosure, carrying out a first operation for thermal destruction of only a portion of said gases in which decomposition of only a portion of said gases into atomic elements has been induced;
    c) carrying out a second operation for thermal destruction of the gases having undergone the first operation for thermal destruction by mixing, in a mixing device, said gases from the first operation for thermal destruction, with air and/or with oxygen;
    d) achieving a recombination of the atomic elements into gases by cooling at least one portion of the gases from the mixing; and
    e) discharging the gases.

2. The method according to claim 1, wherein the supply of oxygen gas is achieved by using pure oxygen as a single plasma-forming gas.

3. The method according to claim 1, wherein the at least one plasma-forming gas is not composed of oxygen, does not comprise oxygen, or comprises little oxygen, and the supply of oxygen gas is achieved by bringing oxygen gas into the plasma or into the vicinity of the plasma.

4. The method according to claim 3, wherein the supply of oxygen gas is achieved by introducing oxygen gas into the plasma at a location identical or close to the location where the feed is introduced and simultaneously with the latter.

5. The method according to claim 3, wherein a molar ratio of the oxygen gas supplied to the organic compound(s) is greater than a stoichiometric combustion ratio.

6. The method according to claim 1, wherein the mixing device comprises a venturi device into which air and/or oxygen gas is injected.

7. The method according to claim 1, wherein, in step c), mixing is achieved by an air and/or oxygen distribution ring which injects air and/or oxygen gas towards the main axis of the reaction enclosure.

8. The method according to claim 1, wherein at the end of step d) at least one step d1) is provided for chemical treatment of the gases.

9. The method according to claim 8, wherein said at least one step d1) for chemical treatment of the gases is selected from the group consisting of a dehalogenation or neutralization step, a step for deoxidation of nitrogen oxides, and a desulfuration step.

10. The method according to claim 8, wherein the feed further comprises at least one mineral filler and a gas filtering step is provided after step d) and before step d1).

11. The method according to claim 8, wherein at the end of the step for chemical treatment of the gases d1), the gases are treated in a droplet catcher condenser.

12. The method according to claim 1, wherein several identical or different feeds are treated with several plasmas.

13. The method according to claim 1, wherein the feed further contains at least one mineral filler.

14. The method according to claim 7, wherein the feed further contains at least one mineral filler.

\* \* \* \* \*